UNITED STATES PATENT OFFICE.

FRITZ ACH, OF MANNHEIM, GERMANY, ASSIGNOR TO C. F. BOEHRINGER & SOEHNE, OF WALDHOF, GERMANY.

ALKOXY-CAFFEIN AND PROCESS OF MAKING SAME.

SPECIFICATION forming part of Letters Patent No. 667,380, dated February 5, 1901.

Application filed April 16, 1898. Serial No. 677,858. (Specimens.)

*To all whom it may concern:*

Be it known that I, FRITZ ACH, a citizen of the German Empire, residing at Mannheim, in the Empire of Germany, have invented certain new and useful Improvements in the Art of Preparing Alkoxy-Caffeins; and I do hereby declare the following to be a full, clear, and exact description of the invention, such as will enable others skilled in the art to which it appertains to make and use the same.

The present invention relates to the art of preparing alkoxy-caffeins; and its object in particular is the production of 3'-alkoxy-caffeins—that is to say, such substituted caffeins in which the group $C_nH_{2n+1}.O.CH_2$ is substituted for the $CH_3$ in the position (3) of the caffein molecule, thus—

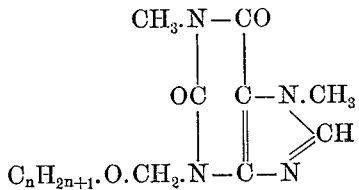

The invention consists, broadly, in treating 3'-alkoxy-8-chloro-caffein with reducing agents; and it, moreover, consists in such further features, steps, and methods as will be hereinafter set forth, and pointed out in the claims.

I will now give a detailed description of my invention and the manner in which it may be carried out.

In preparing the 3'-alkoxy-caffeins I start from 3'-alkoxy-8-chloro-caffein, which in turn is prepared from 3'-8-dichloro-caffein. As both of these compounds and their methods of preparation have not heretofore been described, but form the subject-matter of my applications, Serial Nos. 677,857 and 677,854, respectively, filed concurrently herewith, I will first give a description of these for the purpose of a full disclosure.

*Preparation of 3'-8-dichloro-caffein.*—I take twenty-three parts, by weight, of dried chloro-caffein and heat them to from 150° to 155° centigrade in a digester, together with thirty parts, by weight, (corresponding to one and one-half molecules per molecule of chloro-caffein,) of phosphorus-penta-chlorid and one hundred parts, by volume, of phosphorus-oxy-chlorid, maintaining this temperature for from eight to nine hours. The mass is then allowed to cool, when it will be found that no more pressure exists in the vessel and that a reddish-brown solution has been formed containing colorless acicular crystals in suspension. The entire product of the reaction is then well evaporated *in vacuo*, whereby a reddish-brown resinous substance of a tough consistency will be obtained. By dissolving this product in ether and allowing it to stand for some time (about eight to fourteen days) a slightly-colored crystalline mass is obtained, which is then triturated with a little (about one-half part) cold benzol, siphoned off or decanted, and then redissolved in and recrystallized from warm ether. The new compound 3'-8-dichloro-caffein or 3-chloro-methyl-1-7-dimethyl-8-chloro-xanthin is so obtained in colorless shining well-formed crystals whose analysis gives figures corresponding to the formula $C_8H_8N_4O_2Cl_2$. This new compound melts at 144° to 145.5° centigrade, forming a colorless liquid. With chlorin-water it gives the murexid test. It is readily soluble in cold chloroform, acetone, acetic ether, benzene, and in warm ether and alcohol, but soluble with difficulty in cold water. On boiling the same with alcohol or water hydrochloric acid is split off, 3'-oxy-8-chloro-caffein or 3-oxymethylene-1-7-dimethyl-8-chloro-xanthin or derivatives of the same being formed.

In preparing the 3'-methoxy-8-chloro-caffein it is not necessary to start with the 3'-8-dichloro-caffein in its pure and crystalline condition; but I may employ directly the syrup or resinous substance which, according to the above, serves for the production of the crystalline product 3'-8-dichloro-caffein. Such syrup is boiled, together with about twenty times its weight of absolute methyl-alcohol, for from five to six hours in a reflux cooler. The alcohol is then distilled off completely, and the residue is taken up with ether and washed with water to remove the hydrochloric acid. The ether is evaporated and a little (about two parts) methyl-alcohol is poured over the residue, which after some time begins to solidify to a crystalline mass. This crystalline mass is then redissolved in methyl-alcohol and recrystallized therefrom, whereby the new body 3'-methoxy-8-chlorocaffein is obtained in the form of fine shining needles felted together asbestos-like. An analysis of them gives figures corresponding to the formula $C_9H_{11}N_4O_3Cl$, the constitution of the new compound being represented in the structural formula

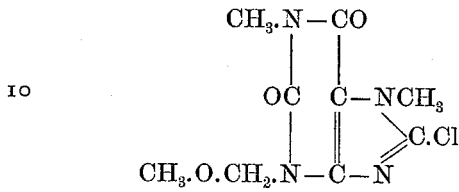

This new compound 3'-methoxy-8-chloro-caffein melts at 129° to 130° centigrade. With dilute nitric acid or with chlorin-water it gives a strong murexid reaction. It is readily soluble in boiling water, hot alcohol, benzol, acetone, acetic ether, and chloroform. It is, moreover, readily soluble in fuming hydrochloric acid. If this solution is heated for some time on the water-bath, however, decomposition takes place, chloro-paraxanthin, which separates in the form of coarse colorless prisms, being formed, attended by a splitting off of formic aldehyde and methylchlorid.

*Preparation of 3'-methoxy-caffein.*—This new compound is obtained by a reduction of the 3'-methoxy-8-chloro-caffein just described. If one part of this methoxy-chloro-caffein is heated to from 105° to 110° centigrade under pressure—i. e., in a closed vessel—together with two parts of zinc-dust, twenty parts of water, and one part, by volume, of concentrated ammonia solution, and this temperature is maintained for from four to five hours while agitating the mixture, a complete reduction to 3'-methoxy-caffein is effected. For isolating the new body the liquid while still hot is filtered from the zinc-dust, and the filtrate after having been evaporated is repeatedly (two or three times) shaken, together with chloroform. The residue after evaporation is redissolved and crystallized from benzene, whereby the 3'-methoxy-caffein is obtained in the form of shining colorless prisms or as fine felted needles. On drying at 105° centigrade an analysis of the same shows that the formula $C_9H_{12}N_4O_3$, or structurally

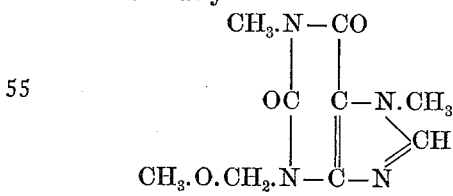

is to be assigned to the new compound. The crystals melt at from 121° to 123° centigrade and sublime when heated to a higher temperature, remaining undecomposed in part. With chlorin-water they give a murexid reaction.

3'-methoxy-caffein is readily soluble in cold water, alcohol, benzene, acetone, or chloroform and is best recrystallized from warm ether or boiling ligroin. From an aqueous solution it is precipitated in the form of fine needles by alkaline lyes.

By heating the same with hydrochloric acid 3'-methoxy-caffein is converted into paraxanthin.

In treating other 3'-alkoxy-8-chloro-caffeins in a similar manner to the above the corresponding 3'-alkoxy-caffeins will be obtained.

The new 3'-alkoxy-caffeins have the following properties: They are crystallizable derivatives of caffein. They are readily soluble in hot water and in alcohol. On heating them with mineral acids the group $CH_2-O-C_2H_{2n+1}$ bound to the N-atom in the position 3 is split off.

What I claim, and desire to secure by Letters Patent of the United States, is—

1. In the art of preparing alkoxy-caffeins, the process which consists in acting upon 3'-alkoxy-8-chloro-caffeins with a reducing agent.

2. The process which consists in treating 3'-methoxy-8-chloro-caffein with a reducing agent.

3. The process which consists in heating 3'-methoxy-8-chloro-caffein with zinc-dust and ammonia under pressure, and in the proportions set forth.

4. The process which consists in heating 3'-methoxy-8-chloro-caffein with zinc-dust and ammonia under pressure in the proportions set forth, then separating the resultant liquid from the zinc-dust and evaporating the same and treating the residue with chloroform.

5. The process which consists in heating 3'-methoxy-8-chloro-caffein with zinc-dust and ammonia under pressure, in the proportions set forth, then separating the resultant liquid from the zinc-dust and evaporating the same and treating the residue with chloroform, and finally evaporating the chloroform and crystallizing the residue from benzol.

6. As a new chemical compound, a 3'-alkoxy-caffein which is distinguished from caffein proper by having the group $C_nH_{2n+1}O.CH_2$ substituted for the methyl in the position 3; are crystallizable derivatives of caffein, readily soluble in hot water and in alcohol and which on being heated with mineral acids split off the group $CH_2-O-C_2H_{2n+1}$.

7. As a new chemical compound 3'-methoxy-caffein which has the formula above given and which is distinguished by the following characteristics: it crystallizes in the form of shining colorless prisms or fine felted needles, which melt at from 121° to 123°, centigrade, and sublime at higher temperatures; it gives the murexid reaction with chlorin-water; it is readily soluble in cold water, alcohol, benzene, acetone or chloroform.

In testimony whereof I affix my signature in presence of two witnesses.

FRITZ ACH.

Witnesses:
LORENZ ACH,
GUSTAV HEINRICHS.